(12) United States Patent
Öhrvall et al.

(10) Patent No.: US 7,243,943 B2
(45) Date of Patent: Jul. 17, 2007

(54) AIR-BAG ARRANGEMENT (75) Inventors: Henrick Öhrvall, Dachau (DE);
William M. Abramczyk, Rochester Hills, MI (US)

(73) Assignees: Autoliv Devopment AB, Vagarda (SE); Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/316,143

(22) Filed: Dec. 9, 2002

(65) Prior Publication Data
US 2003/0230876 A1 Dec. 18, 2003

(30) Foreign Application Priority Data
Dec. 7, 2001 (GB) .................. 0129418.0

(51) Int. Cl.
*B60R 21/16* (2006.01)

(52) U.S. Cl. .................... 280/730.2; 280/749

(58) Field of Classification Search ............ 280/730.2, 280/749, 743.1, 729, 730.1
See application file for complete search history.

(56) References Cited

U.S. PATENT DOCUMENTS

| 5,322,322 | A * | 6/1994 | Bark et al. ............... 280/730.2 |
| 6,234,516 | B1 * | 5/2001 | Boxey ...................... 280/730.2 |
| 6,361,068 | B1 * | 3/2002 | Stein et al. .............. 280/730.2 |
| 6,450,527 | B2 * | 9/2002 | Kobayashi et al. ......... 280/729 |
| 6,474,678 | B1 * | 11/2002 | Boxey ...................... 280/728.2 |
| 6,530,595 | B2 * | 3/2003 | Masuda et al. .......... 280/730.2 |
| 6,659,502 | B2 * | 12/2003 | Breyvogel et al. ....... 280/743.1 |
| 6,685,219 | B1 * | 2/2004 | Yamaji et al. ........... 280/730.2 |

FOREIGN PATENT DOCUMENTS

| EP | 1227013 | 7/2002 |
| GB | 2327066 A1 | 7/1997 |
| JP | 2000127885 | 5/2000 |
| WO | WO 02/051670 A1 | 7/2002 |

* cited by examiner

*Primary Examiner*—Eric Culbreth
(74) *Attorney, Agent, or Firm*—Madson & Austin (57) ABSTRACT An air-bag arrangement in the form of inflatable curtain (1) has a plurality of inflatable regions (12, 19, 25) spaced from the front of the inflatable curtain to the rear of the inflatable curtain. The rear-most inflatable region (25) is connected by a gas flow passage (23) to the lower-most part of an inflatable chamber (22) forming part of the next forward inflatable region (19) at a point remote from the point where a gas flow duct (8) associated with a gas generator (7) injects gas into that chamber (22). The rear-most inflatable region (25) of the inflatable element does not inflate until after the two forward regions (12, 19) have inflated, and possibly does not open until the region (19) connected to the gas flow passage(23) has been struck by the head of an occupant. An occupant in a rear-most row of seats is normally spaced further from the inflatable curtain than a more forwardly positioned occupant, and thus the rear-most chamber (25) will be inflated before being struck by a rear occupant.

16 Claims, 6 Drawing Sheets

AIR-BAG ARRANGEMENT

BACKGROUND OF THE INVENTION

1. Field of the Invention

THE PRESENT INVENTION relates to an air-bag arrangement, and more particularly relates to an air-bag arrangement in the form of an inflatable curtain.

2. Description of Related Art

It has been proposed to provide an inflatable curtain in a motor vehicle. The inflatable curtain is in the form of an air-bag which is initially mounted and stored, for example, in the roof lining of the vehicle at a position above the door openings at the side of the vehicle. In response to an accident, especially a side impact or roll-over accident, the inflatable curtain inflates and extends downwardly from its mounting position, to extend adjacent the windows in the motor vehicle. The inflatable curtain is positioned between the head of each occupant and the adjacent window, thus providing a degree of protection for the head of the occupant and minimising the risk that the head of the occupant will be thrown out, through the window opening, after the window has broken during the accident.

Inflatable curtains are often formed from air-bags having inflatable regions and uninflatable regions, with the inflatable regions being divided into one or more elongate cells or chambers. Each inflatable region is located at a position where it is most likely that the head of an occupant will strike the inflatable curtain during an accident. It is desirable for each inflatable region to be inflated before the head of an occupant adjacent that inflatable region strikes the inflatable curtain.

It has been found that in many motor vehicles, especially vehicles having multiple rows of seats, an occupant in the rear-most row of seats is positioned, probably due to the presence of a rear wheel mudguard, closer to the centre or axis of the vehicle than a vehicle occupant sitting further towards the front of the vehicle. Thus the head of an occupant towards the front of the vehicle will almost inevitably impact with an inflatable curtain before the head of an occupant of the rear-most row of seats. This applies especially in connection with a vehicle having three rows of seats, but may also apply to some vehicles having two rows of seats.

It is desirable to inflate an inflatable curtain using a minimum quantity of gas to minimize the costs and the weight of the gas generator. Also, it is further desirable for an inflatable curtain to be inflated within a very short period of time, for example, during a time period of approximately 18 mS.

SUMMARY OF THE INVENTION

The present invention seeks to provide an improved air-bag arrangement in the form of an improved inflatable curtain.

In this Specification forward and front are intended to refer to that part of the air-bag which is to be located towards the front of the vehicle, and rear is intended to refer to that part of the air-bag which is to be located towards the back of the vehicle.

According to this invention there is provided an air-bag arrangement in the form of an inflatable curtain, the inflatable curtain comprising an inflatable element, the inflatable element, at one edge, being provided with a gas supply duct associated with a gas generator, mounting elements being provided to mount the inflatable element to the motor vehicle, a front-most mounting element being present on an extension means extending from a forward-most part of the inflatable element to be connected to a mounting on an "A"-Post of the vehicle, and further mounting means serving to mount at least the gas generator and the associated gas supply duct to the roof line of the motor vehicle, the inflatable element being divided into separate inflatable zones to provide protection for vehicle occupants seated one-behind-the-other, the gas supply duct being connected to inject gas directly into at least one forward-most inflatable zone, the rear-most inflatable zone being connected to the next forward inflatable zone by means of a gas flow passage, the gas flow passage communicating with said next forward inflatable zone at a position remote from the gas supply duct.

Preferably at least one inflatable region is divided into a plurality of chambers or cells so that, on inflation of the inflatable element, the length of the inflatable element between a rear-most mounting element and the front-most mounting element is reduced.

Conveniently the inflatable element includes at least one uninflatable region located between and separating two adjacent, but spaced apart inflatable regions.

In a preferred embodiment the said gas supply passage is initially closed by a tear seam adapted to tear to open the gas flow passage when subjected to a predetermined pressure.

In one embodiment of the invention the rear-most inflatable zone is adapted to inflate after the next forward inflatable zone has reached a predetermined gas pressure.

In another embodiment of the invention the rear-most inflatable zone is adapted to inflate after the head of the occupant in front of the rear-most occupant has struck the said next forward inflatable zone.

In one embodiment the arrangement is for use in a vehicle with three rows of seats, the inflatable element comprising a forward-most inflatable region, and an intermediate inflatable region which communicates with said gas flow duct leading to a third, rear-most inflatable region.

In an alternative embodiment the inflatable element is for use in a motor vehicle having two rows of seat, the inflatable element comprising a forward-most inflatable region which communicates with said gas flow duct leading to a rear-most inflatable region.

Conveniently the extension is a strap.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
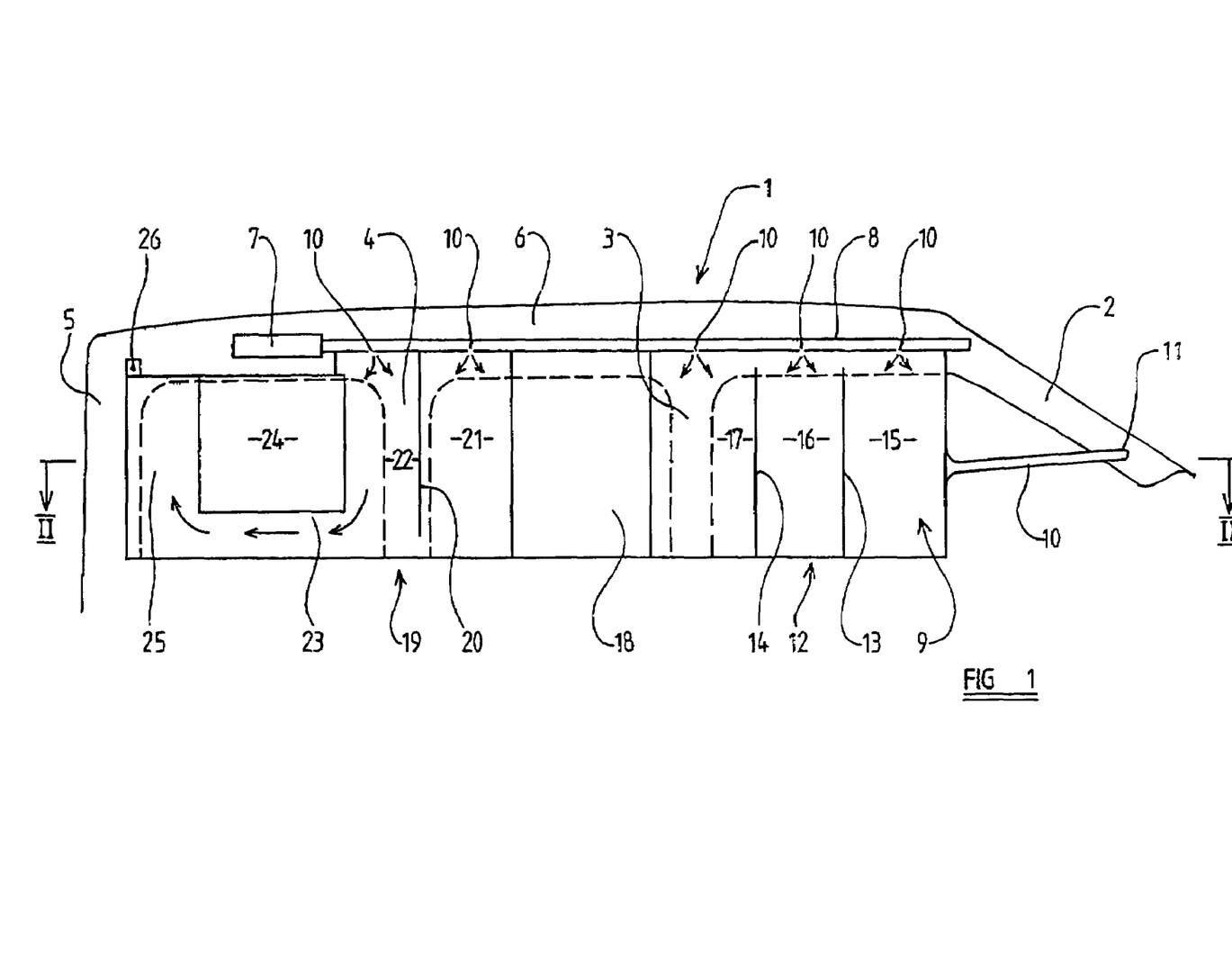
FIG. 1 is a diagrammatic view of an inflatable curtain in accordance with the invention mounted in a vehicle and in a deployed state, with parts of the vehicle being shown in phantom, and with the flow of gas being illustrated, by arrows.

Referring initially to FIG. 1, an inflatable curtain 1 is shown mounted in position within a motor vehicle. The motor vehicle is intended to contain three rows of passengers. Illustrated in FIG. 1 is the "A"-Post 2 which is located towards the front of the vehicle, a "B"-Post 3, a "C"-Post 4 and a "D"-Post 5. A roof rail 6 extends across the top of the door or window openings formed between the various posts.

The inflatable curtain 1 is provided with a gas generator 7 which is connected to an elongate gas supply duct 8 which is secured to the roof rail 6, and which extends into the upper part of an inflatable element 9 which constitutes the inflatable curtain. The inflatable element has its upper edge secured to the gas duct 8. The gas duct 8 is provided with various apertures 10 at selected positions spaced apart along its length through which gas may emerge from the gas duct into inflatable regions of the inflatable element 9.

The inflatable element 9 is of generally rectangular form, and, at the end of the inflatable element 9 located at the forward-most position in the motor vehicle, an extension in the form of a strap 10 is provided which extends from a point in the region of the lower edge of the inflatable element to a mounting 11 provided at a point on the "A"-Post 2 below the line of the roof rail 6. The strap 10 is provided with an appropriate connecting element to connect the strap to the mounting 11.

The forward-most part 12 of the inflatable element is an inflatable region provided with substantially vertical extending seams 13, 14, which divide the region 12 into three inflatable cells or chambers 15, 16, 17. The chambers are of elongate form, and each chamber defines an axis which, in the described embodiment, is substantially vertical, thus extending perpendicularly to the lower-most edge of the inflatable element 9. Each chamber 15, 16, 17 is aligned with a respective opening 10 formed in the gas supply duct 8 so that the chambers may receive gas from the gas generator 7.

The rear-most edge of the rear-most chamber 17 is bounded by an uninflatable region 18 of the inflatable element. To the rear of the uninflatable region 18 there is provided a further inflatable region 19 which is divided by a single seam 20 into two cells or chambers 21, 22. Bach of these cells 21, 22 is associated with a respective opening 10 in the gas supply duct 8. The uninflatable region 18 is thus located between, but separates, the two inflatable regions 12 and 19. At the rear-most part of the rear-most chamber 22 of the inflatable region 19, at a position adjacent the lower-most edge of the inflatable element 9, a gas flow passage 23 is defined which extends beneath a non-inflatable region 24 of the inflatable element, to a single inflatable chamber 25 formed at the very rear of the inflatable element.

At the rear of the inflatable element, just above the inflatable chamber 25, is an anchoring lug 26 by means of which this part of the inflatable element may be secured to the roof rail 6.

The inflatable element is mounted in position by mounting the gas generator 7 and the associated gas supply duct firmly in position to the roof rail 6, by connecting the connecting element provided at the forward-most end of the strap 10 to the mounting 11, and by connecting the mounting lug 26 to the roof rail 6. It may have more mounting lugs between the mounting lug 26 and the strap 10.

The inflatable element will normally be in a folded condition stored within a recess or housing which extends immediately adjacent the gas generator 7 and the gas supply duct 8. The strap 10 will be accommodated within an extension of the recess which extends along the "A"-Post 2, or will at least be concealed behind trim provided on the "A"-Post.

In the event that a side impact or roll-over accident should occur, the gas generator will generate gas which will flow along the gas supply duct 8 and inflate the inflatable element in a manner which will be described in greater detail below.

Figure 2:
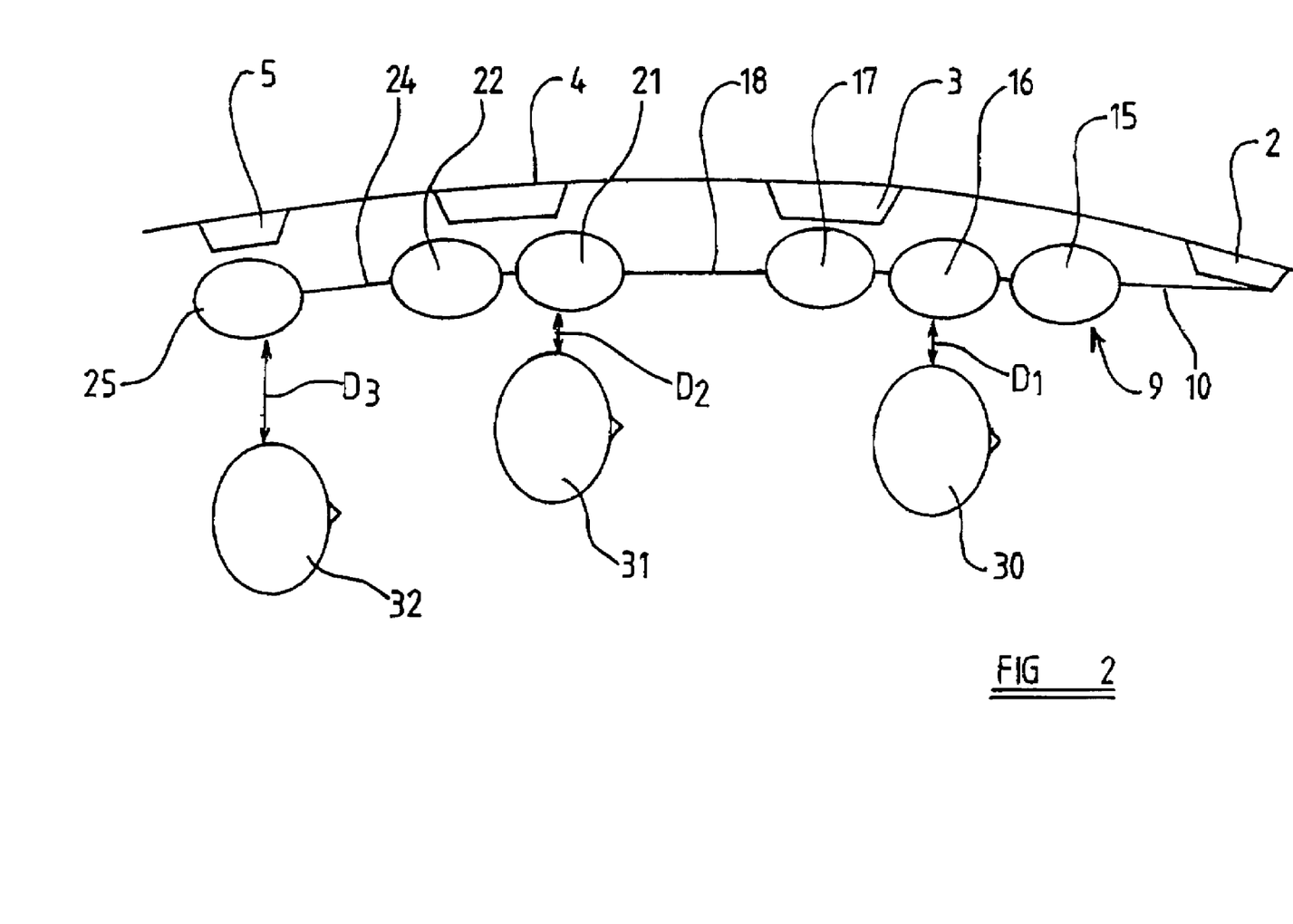
FIG. 2 is a sectional view taken on the line II—II of FIG. 1 provided for explanatory purposes.

FIG. 2 is a figure provided for explanatory purposes and illustrates the situation that would exist if the inflatable element 9 were to be fully inflated whilst three occupants of the vehicle, seated one behind the other, were in their ordinary positions.

It can be seen that as the air-bag has become inflated, the various cells or chambers 15, 16, 17, 21, 22 and 25 have all become inflated and have adopted a substantially cylindrical or oval form. Here it is to be understood that if the inflatable element 9 were laid out flat, before inflation, the distance between the anchoring lug 26 and the forward-most end of the strap 10 provided with the connecting element which engages the mounting 11 could be measured. On inflation, because the cells or chambers aft-the oval or rounded form, as shown in FIG. 2, this distance would be reduced. Here it is to be understood that the inflatable element 9 is so designed that, in the uninflated state the inflatable element may be stated within the recess provided for that purpose, because the actual length of the recess between the mounting lug 26 and the forward-most end of the strap 10 on the inflatable element is greater than the distance in a straight line between the point in the roof line 6 adapted to receive the mounting lug 26 and the mounting 11 on the "A"-Post of the motor vehicle. On inflation of the inflatable element, however, because the cells or chambers adopt the rounded or oval configuration, the inflatable element becomes tensioned, and a line oˆ tension is created which extends from the forward-most mounting 11 on the "A"-Post 2 to the point where the lug 26 is secured to the roof of the vehicle. The inflatable element is thus held firmly in the desired position, and any tendency for the lower-most part of the inflatable element to flap about is minimized.

As can be seen in FIG. 2, the vehicle has three occupants seated adjacent the inflatable element 9. The first occupant 30 is the driver or a front seat passenger, and the head of the driver or front seat passenger is separated by a distance D1, from the adjacent chambers 15, 16, 17, which are positioned to provide protection especially as regards impact with the "B"-Post 3 of the motor vehicle. Similarly for the next occupant of the vehicle, 31, who is seated directly behind the first occupant 30, the head of the occupant is spaced from the adjacent inflated chambers 21, 22 by a distance D2. Finally, the third occupant of the vehicle, 32, is shown in position behind the first two occupants, and the head of the third occupant is spaced from the adjacent chamber 25 by a distance D3. Because the rear-most occupant 32 is sitting closer to the axis of the vehicle than the occupants in front of him, the distance between the head of the third occupant 32 and the adjacent inflated cell or chamber 25, distance D3, is greater than distance D1 and is greater than distance D2.

Consequently it is to be understood that in a side impact situation, the head of the first occupant 30 and the head of the second occupant 31 will almost certainly strike the inflatable element before the head of the third occupant 32 strikes the inflatable element. As has been mentioned, it is important that the inflatable element should be inflated before the head of the occupant strikes that part of the inflatable element that is to protect the occupant.

Returning to FIG. 1, it can be seen that gas from the gas supply duct 8 is fed directly to the first inflatable region 12, and to the second inflatable region 19 and thus, on actuation of the gas generator 7, the inflatable region 12 and the inflatable region 19 become inflated very rapidly. However, the rear-most inflatable chamber 25 is only inflated by gas flowing through the gas flow passage 23 which communicates with part of the chamber 22 which is remote from the gas supply duct 8. Thus the chamber 22 must become substantially inflated or the pressure within the chamber 22 must be raised in some other way, before gas will flow through the gas flow passage 23 to inflate rear-most chamber 25.

Figure 3:
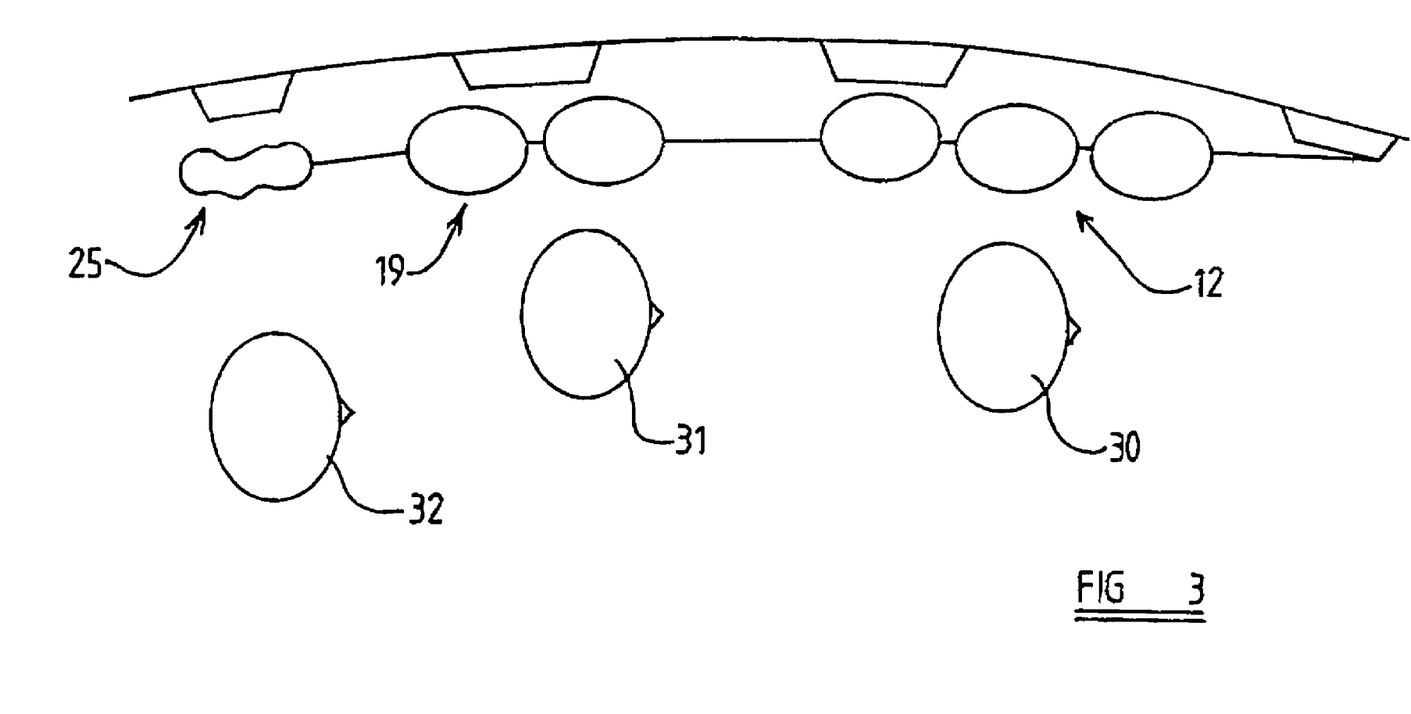
FIG. 3 is a view taken on the line II—II showing an early stage in the inflation of the inflatable curtain in an accident situation.
Figure 4:
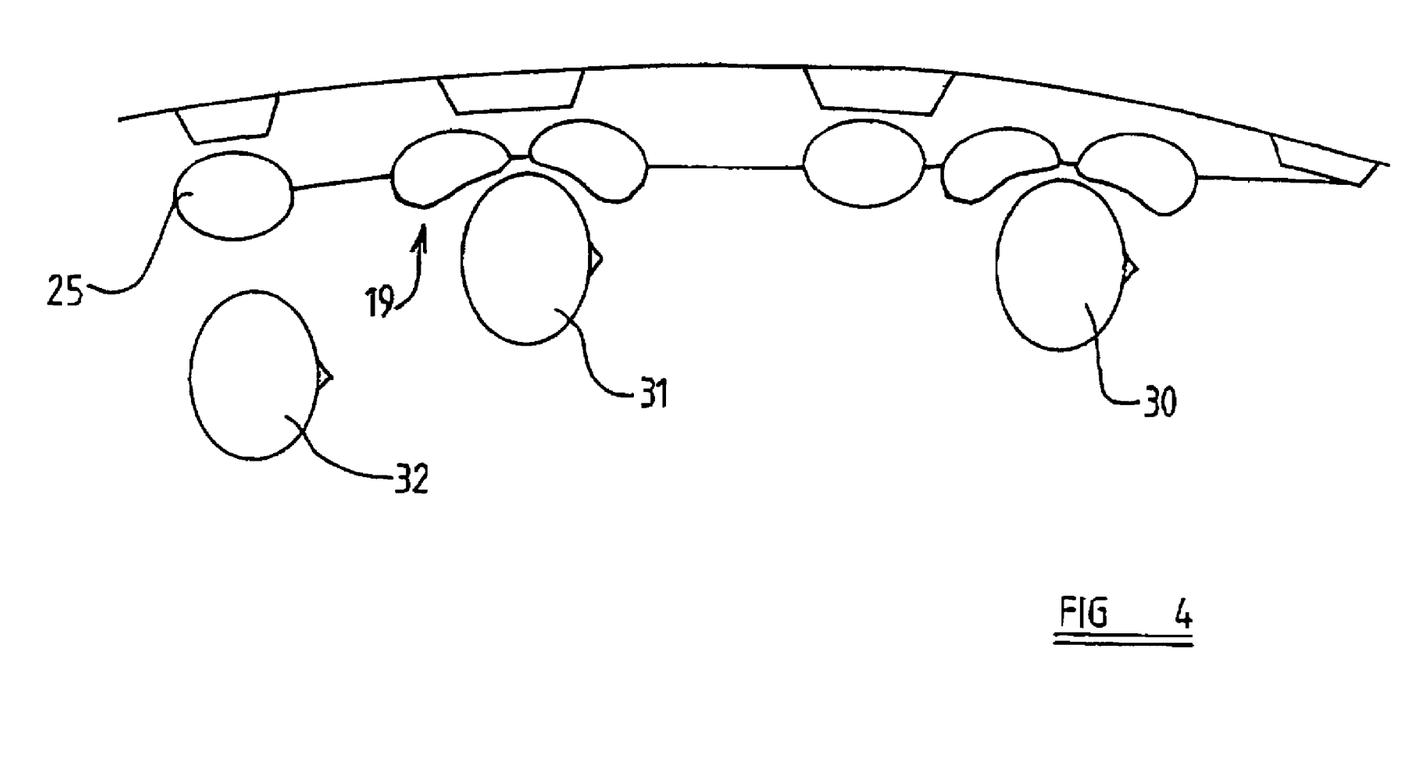
FIG. 4 is a view corresponding to FIG. 3 showing a later stage in the same accident situation.

Turning now to FIG. 3, which corresponds generally with FIG. 2, but illustrates a situation that can exist when the inflatable element 9 is being inflated, it is to be seen that at a stage during a side impact situation, shortly following sensing of the side impact situation, the inflatable region 12 is fully inflated and the inflatable region 19 is fully inflated, but the rear-most chamber 25 is not fully inflated. If the heads of the occupants of the vehicle all move effectively towards the side of the vehicle, the heads of the occupants 30, 31 will strike the inflatable curtain before the head of the rear-most occupant 32. As the head of the occupant 31 impacts with the inflated region 19, the pressure of gas within the chamber 22 will rise substantially causing a flow of gas along the gas flow duct 23 to fully inflate the rear-most chamber 25. The rear-most chamber 25 is thus fully inflated before the head of the rear-most occupant 32 impacts with that chamber 25, as shown in FIG. 4.

It is to be appreciated that the tension that is created in the inflatable element between the mounting lug 26 and the fixing provided at the forward end of the strap 10 is provided almost completely by the tensioning effect provided by the chambers 15, 16, 17, 21 and 22. The rear-most chamber 25 does not effectively contribute to the creation of the line of tension. Thus an adequate line of tension is present before the rear-most chamber 25 becomes inflated.

Figure 5:
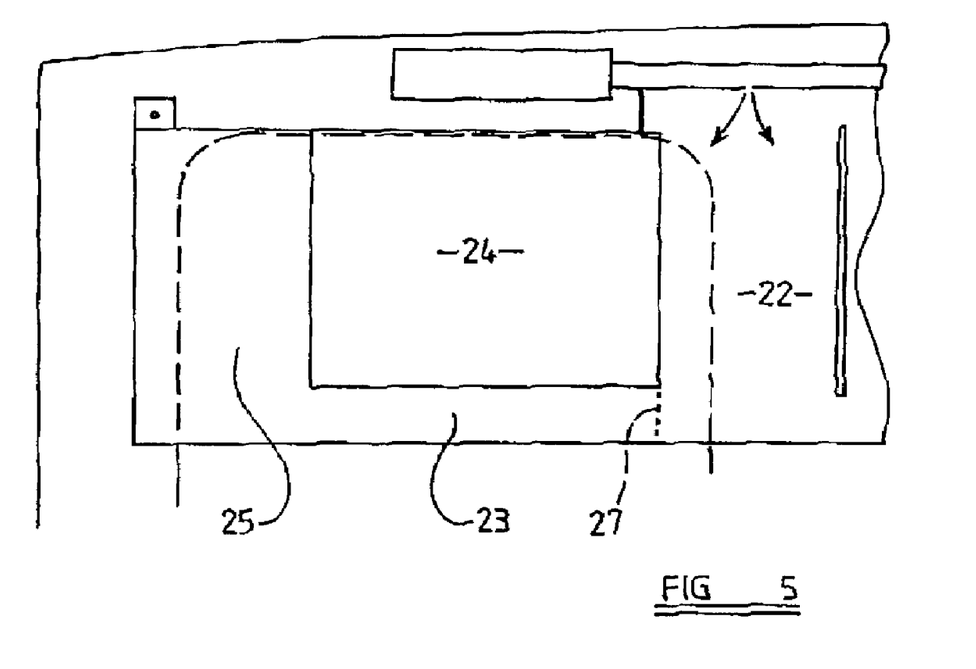
FIG. 5 is a view corresponding to an enlarged portion of FIG. 1 illustrating a modified embodiment of the invention.

Turning now to FIG. 5 of the accompanying drawings which illustrates a modified embodiment of the invention, it can be seen that in this embodiment of the invention the gas flow passage 23 has the end thereof communicating with the chamber 22 initially sealed by means of a tear seam 27. The tear seam is adapted to tear when pressure within the chamber 22 exceeds a predetermined threshold. The threshold may be reached on ordinary inflation of the air-bag without the chamber 22 being impacted by the head of an adjacent occupant, or the pressure necessary to burst the tear seam may only be experienced when the chamber 22 is at least partially inflated and is impacted by the head of an occupant of the vehicle.

Figure 6:
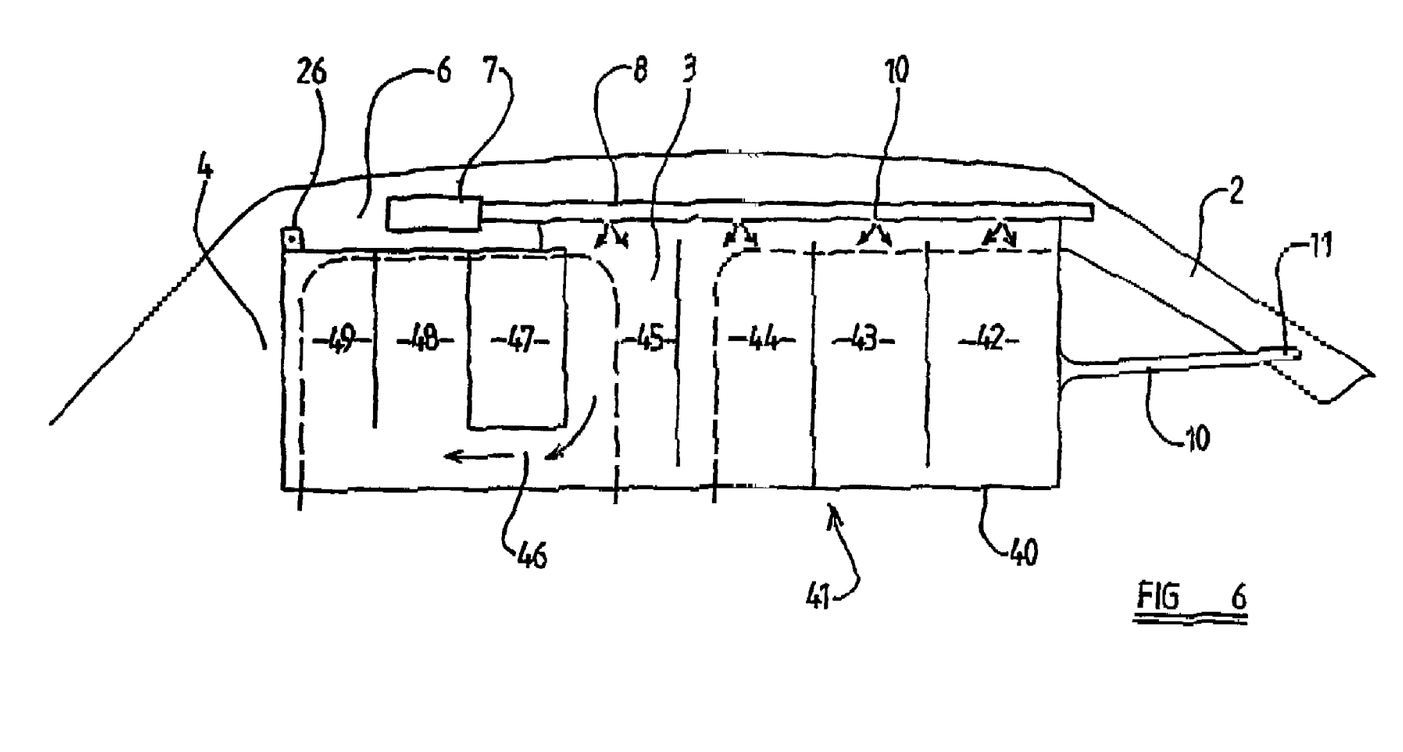
FIG. 6 is a schematic view corresponding to FIG. 1 illustrating another modified embodiment of the invention.

FIG. 6 illustrates a modified embodiment of the invention intended for use in a motor vehicle where there are only two rows of seats. In this embodiment, parts of the described embodiment which are identical with parts of the previously described embodiment, are given the same reference numerals and will not be re-described.

It is to be observed that in the embodiment of FIG. 6, an inflatable element 40 is provided which is associated with a gas generator 7, and gas supply duct 8 of the type described above. The inflatable element 40 has a front-most inflatable region 41 divided into four chambers or cells 42, 43, 44 and 45, this region being adapted to provide protection for the head of the driver. The rear-most part of the rear-most cell 45 of the inflatable region 45 is associated with a gas flow duct 46 which communicates with the cell 45 at a position remote from the gas supply duct 8. The gas flow passage 46 may initially be sealed by a tear seam. The gas flow passage 46 extends beneath an uninflatable region 47 of the inflatable element 40 to communicate with two cells 48, 49 provided at the rear-most part of the inflatable element 40 to provide protection for a rear seat passenger.

It is to be understood, of course, that a very high proportion of all journeys carried out in motor cars which can carry passengers in two rows of seats, are completed with no passengers present in the rear row of seats. Thus, in the majority of side impact or roll-over accidents, the primary function of the inflatable curtain is to provide protection for a person sitting in the front row of seats.

In the embodiment now described, the part of the inflatable element 41 which is to provide protection for a driver or front seat occupant is inflated initially, with the direct injection of gas from the gas flow duct 8, and finally the inflatable region constituted by the cells 48 and 49, which is to provide protection for a rear seat passenger, is inflated. The inflation of the rearward-most part may be effected with the passage of time, or, as in the embodiment described above, inflation of the rearward-most part may be at least assisted by an impact of the head of a front seat occupant on that part of the inflatable element which is intended to provide protection for a front seat occupant.

The present invention provides an inflatable curtain which will provide protection for occupants of a motor vehicle seated in multiple rows of seats, but provides an inflatable curtain which can be inflated to an operative condition providing protection for occupants of the vehicle in front of the rear-most occupant within a very short period of time, with the area of the inflatable curtain that is to provide protection for the rear-most occupant becoming inflated subsequently, with that inflation possibly being assisted or initiated by the impact of the head of an occupant in front of the rear-most occupant with part of the inflatable element.

In the present Specification "comprise" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. An arrangement comprising:
   a vehicle having an "A"-Post, a "B"-Post, a "C"-Post, and a "D"-Post;
   an inflatable curtain comprising:
   an inflatable element divided into three separate inflatable regions comprising a forward-most inflatable region, an intermediate inflatable region and rear-most inflatable region, said inflatable regions being configured to provide protection for vehicle occupants seated one-behind-the-other, the rear-most inflatable region being connected to the intermediate inflatable region only by means of a gas flow passage;
   a gas supply duct positioned at one edge of the inflatable element, the gas supply duct being associated with a gas generator for the inflatable element, the gas supply duct being connected to inject gas directly into the forward-most and intermediate inflatable regions, wherein the gas flow passage communicates with said intermediate inflatable region at a position remote from the gas supply duct; and mounting elements for mounting the inflatable element to a motor vehicle comprising a front-most mounting element on an extension extending from a forward-most part of the inflatable element for connection to a mounting on the "A"-Post of the vehicle, the arrangement being configured for mounting at least the gas generator and the associated gas supply duct to a roof line of the vehicle, wherein, the forward-most inflatable region is disposed such that when inflated, the forward-most inflatable region will be positioned adjacent to the "B"-Post of the vehicle, the intermediate inflatable region is disposed such that when inflated, the intermediate inflatable region will be positioned adjacent to the "C"-Post of the vehicle, and the rear-most inflatable region is disposed such that when inflated, the rear-most inflatable region will be positioned adjacent to the "D"-Post of the vehicle.

2. An arrangement according to claim 1 wherein at least one inflatable region is divided into a plurality of chambers or cells so that, on inflation of the inflatable element, the length of the inflatable element between a rear-most mounting element and the front-most mounting element is reduced.

3. An arrangement according to claim 1 wherein the inflatable element includes at least one uninflatable region located between and separating two adjacent, but spaced apart inflatable regions.

4. An arrangement according to claim 1 wherein the rear-most inflatable region is adapted to inflate after the next forward inflatable region has reached a predetermined gas pressure.

5. An arrangement according to claim 1 wherein the rear-most inflatable region is adapted to inflate after the head of an occupant in front of a rear-most occupant has struck the next forward inflatable region.

6. An arrangement according to claim 1 wherein the gas supply passage is initially closed by a tear seam adapted to tear to open the gas flow passage when subjected to a predetermined pressure.

7. An arrangement according to claim 1 for use in a vehicle with three rows of seats.

8. An arrangement according to claim 1 wherein the extension is a strap.

9. An arrangement comprising:

a vehicle having an "A"-Post, a "B"-Post, a "C"-Post, and a "D"-Post;

an inflatable curtain comprising:

an inflatable element divided into three separate inflatable regions comprising a forward-most inflatable region, an intermediate inflatable region and rear-most inflatable region, said inflatable regions being configured to provide protection for vehicle occupants seated one-behind-the-other, the rear-most inflatable region being connected to the intermediate inflatable region only by means of a gas flow passage;

a gas supply duct positioned at one edge of the inflatable element, the gas supply duct being associated with a gas generator the inflatable element, the gas supply duct being connected to inject gas directly into the forward-most and intermediate inflatable regions, wherein the gas flow passage communicates with said intermediate inflatable region at a position remote from the gas supply duct; and mounting elements for mounting the inflatable element to a motor vehicle comprising a front-most mounting element being present on an extension extending from a forward-most part of the inflatable element for connection to a mounting on the "A"-Post of the vehicle, the arrangement being configured for mounting at least the gas generator and the associated gas supply duct to a roof line of the vehicle, wherein, the forward-most inflatable region is disposed such that when inflated, the forward-most inflatable region will be positioned adjacent to the "B"-Post of the vehicle and the rear-most inflatable region is disposed such that when inflated, the rear-most inflatable region will be positioned adjacent to the "D"-Post of the vehicle.

10. An arrangement according to claim 9 wherein at least one inflatable region is divided into a plurality of chambers or cells so that, on inflation of the inflatable element, the length of the inflatable element between a rear-most mounting element and the front-most mounting element is reduced.

11. An arrangement according to claim 9 wherein the inflatable element includes at least one uninflatable region located between and separating two adjacent, but spaced apart inflatable regions.

12. An arrangement according to claim 9 wherein the rear-most inflatable region is adapted to inflate after the next forward inflatable region has reached a predetermined gas pressure.

13. An arrangement according to claim 9 wherein the rear-most inflatable region is adapted to inflate after the head of an occupant in front of a rear-most occupant has struck the next forward inflatable region.

14. An arrangement according to claim 9 wherein the gas supply passage is initially closed by a tear seam adapted to tear to open the gas flow passage when subjected to a predetermined pressure.

15. An arrangement according to claim 9 wherein the inflatable element is for use in a motor vehicle having two rows of seats.

16. An arrangement according to claim 9 wherein the extension is a strap.

* * * * *

UNITED STATES PATENT AND TRADEMARK OFFICE
CERTIFICATE OF CORRECTION

PATENT NO. : 7,243,943 B2
APPLICATION NO. : 10/316143
DATED : July 17, 2007
INVENTOR(S) : Henrick Ohrvall et al.

It is certified that error appears in the above-identified patent and that said Letters Patent is hereby corrected as shown below:

On the Title page of the patent in field (73) Assignees, please replace "Autoliv Devopment AB" with -- Autoliv Development AB --.

In Column 3, line 46, please replace "Bach of these cells" with -- Each of these cells --.

In column 4, line 25, please replace "cells or chambers aft-the oval" with -- cells or chambers adopt the oval --.

In column 4, line 38, please replace "a line o^ tension is created" with -- a line of tension is created --.

Signed and Sealed this

Twenty-third Day of October, 2007

JON W. DUDAS
*Director of the United States Patent and Trademark Office*